US012761871B2

(12) United States Patent
Govindachar

(10) Patent No.: US 12,761,871 B2
(45) Date of Patent: Oct. 13, 2026

(54) SYSTEMS, DEVICES AND/OR PROCESSES FOR VERIFICATION OF DATA SORTING OPERATIONS

(71) Applicant: Mercedes-Benz Group AG, Stuttgart (DE)

(72) Inventor: Suresh Govindachar, Milpitas, CA (US)

(73) Assignee: Mercedes-Benz Group AG, Stuttgart (DE)

( * ) Notice: Subject to any disclaimer, the term of this patent is extended or adjusted under 35 U.S.C. 154(b) by 305 days.

(21) Appl. No.: 18/063,568

(22) Filed: Dec. 8, 2022

(65) Prior Publication Data

US 2024/0192919 A1 Jun. 13, 2024

(51) Int. Cl.
*G06F 7/08* (2006.01)
*B60W 60/00* (2020.01)

(52) U.S. Cl.
CPC ............ *G06F 7/08* (2013.01); *B60W 60/001* (2020.02)

(58) Field of Classification Search
CPC .............................. G06F 7/08; B60W 60/001
See application file for complete search history.

(56) References Cited

U.S. PATENT DOCUMENTS

| | | | | |
|---|---|---|---|---|
| 9,983,930 B2 | 5/2018 | Quach et al. | |
| 10,908,995 B2 | 2/2021 | Saxena | |
| 2015/0293216 A1* | 10/2015 | O'Dea | B60W 30/02 701/23 |
| 2022/0357730 A1* | 11/2022 | Satoh | G05B 23/024 |
| 2023/0084918 A1* | 3/2023 | Wiegman | B64D 45/00 701/3 |

* cited by examiner

*Primary Examiner* — Imran K Mustafa
(74) *Attorney, Agent, or Firm* — ANOVA LAW GROUP, PLLC

(57) ABSTRACT

Subject matter disclosed herein may relate to systems, devices, and/or processes for verification of data sorting operations, such as for those that occur in automated driving vehicles.

20 Claims, 9 Drawing Sheets

SYSTEMS, DEVICES AND/OR PROCESSES FOR VERIFICATION OF DATA SORTING OPERATIONS

BACKGROUND

Field

Subject matter disclosed herein may relate to systems, devices and/or processes for verification of data sorting operations, such as for those that occur in automated driving vehicles.

Information

Some electronic systems and/or devices may include one or more integrated circuits, processors and/or computing devices, for example, that may comprise adaptive systems that may change structure, configuration and/or states, for example, based at least in part on signals and/or states to flow through the system and/or device. For example, self-driving/automated driving (e.g., fully autonomous, semi-autonomous, driver assistance systems, etc.) vehicles may comprise a type of adaptive system and/or device implemented via one or more integrated circuits and/or computing devices, for example, that may change its structure, configuration and/or state based at least in part on sensor signals and/or signal packets gathered over time. Processing such sensor signals and/or signal packets over time to affect operation of a self-driving/automated driving vehicle, for example, may present significant challenges.

SUMMARY

An apparatus may comprise a plurality of sensors to generate a plurality of sensor signals and/or signal packets and may also comprise a computing system to include at least one processing circuit, wherein the at least one processing circuit to generate a first set of data elements, wherein each data element of the first set of data elements to comprise a plurality of values, derived at least in part from the sensor signals and/or signal packets, to respectively pertain to particular points within a spatial coordinate system, to sort the first set of data elements in accordance with one or more specified parameters to generate a sorted set of data elements, to verify that the sorted set of data elements has been generated in accordance with the one or more specified parameters, to verify that each data element of the first set of data elements is included in the sorted set of data elements, that each data element of the sorted set of data elements is identical to a respective data element of the first set of data elements and that no additional data elements have been introduced into the sorted set of data elements, and to update a particle filter based at least in part on the sorted set of data elements. In implementations, the apparatus may comprise a method performed by a vehicle and/or may comprise an article including a non-transitory storage medium comprising computer-readable instructions stored thereon that are executable by one or more processing circuits of a computing device of a vehicle, for example.

In implementations, to sort the set of data elements in accordance with the one or more specified parameters, the at least one processing circuit to group the first set of data elements into a plurality of subsets based at least in part on the data elements of the first set of data elements being located within particular grid cells within the spatial coordinate system, and to order the plurality of subsets with respect to distance of the respective grid cells from a specified point along a specified axis and/or trajectory within the spatial coordinate system.

In implementations, to sort the first set of data elements in accordance with the one or more specified parameters, the at least one processing circuit to select the first set of data elements based at least in part on a specified period of time, and to order the first set of data elements with respect to temporal proximity to a specified point in time. Also, in implementations, to verify that each data element of the first set of data elements is included in the sorted set of data elements, that each data element of sorted set of data elements is identical to a respective data element of the first set of data elements and that no additional data elements have been introduced into the sorted set of data elements, the at least one processing circuit to perform one or more operations based at least in part on a plurality of invariant parameters to pertain to the first set of data elements.

In implementations, the at least one processing circuit further to, precedent to the sort of the first set of data elements, generate one or more global invariant parameters to pertain to the first set of data elements, wherein the one or more global invariant parameters to pertain to the first set of data elements are to be derived at least in part from the first set of data elements and are further to be derived independent of any particular order of the data elements of the first set of data elements. Further, to verify that each data element of the first set of data elements is included in the sorted set of data elements and that no additional data elements have been introduced into the sorted set of data elements, the at least one processing circuit to generate one or more global invariant parameters to pertain to the sorted set of data elements, and to compare the one or more global invariant parameters to pertain to the first set of data elements to the one or more global invariant parameters to pertain to the sorted set of data elements. Also, a particular global invariant of the one or more global invariants to pertain to the first set of data elements may comprise a sum of a plurality of values respectively representative of the data elements of the first set of data elements and/or may comprise a number of elements within the first set of data elements.

In implementations, the at least one processing circuit further to, precedent to the sorting the first set of data elements, determine whether the data elements of the first set of data elements respectively include one or more local invariant parameters, wherein the one or more local invariant parameters are to be derived at least in part from the data elements of the first set of data elements. Additionally, at least one of the one or more local invariants may comprise an error correction code.

In implementations, the at least one processing circuit further to, precedent to the sort of the set of data elements, for one or more of the data elements of the set of data elements determined to not include the one or more local invariant parameters, generate the one or more local invariant parameters for the respective one or more of the data elements of the first set of data elements determined to not include the one or more local invariant parameters. Further, to verify that the data elements of the sorted set of data elements are identical to the respective data elements of the first set of data elements, the at least one processor to verify the one or more local invariant parameters for the data elements of the first set of data elements against the respective data elements of the sorted set of data elements.

In implementations, an apparatus may comprise a vehicle, wherein the at least one processing circuit may comprise one or more processing circuits of the vehicle, wherein the vehicle to comprise the plurality of sensors, wherein the plurality of sensors to generate the plurality of sensor signals and/or signal packets, and wherein the at least one processing circuit further to affect one or more autonomous functions of the vehicle based at least in part on the update of the particle filter based at least in part on the sorted set of data elements.

BRIEF DESCRIPTION OF THE DRAWINGS

Claimed subject matter is particularly pointed out and distinctly claimed in the concluding portion of the specification. However, both as to organization and/or method of operation, together with objects, features, and/or advantages thereof, it may be best understood by reference to the following detailed description if read with the accompanying drawings in which:

DETAILED DESCRIPTION

Figure 1:
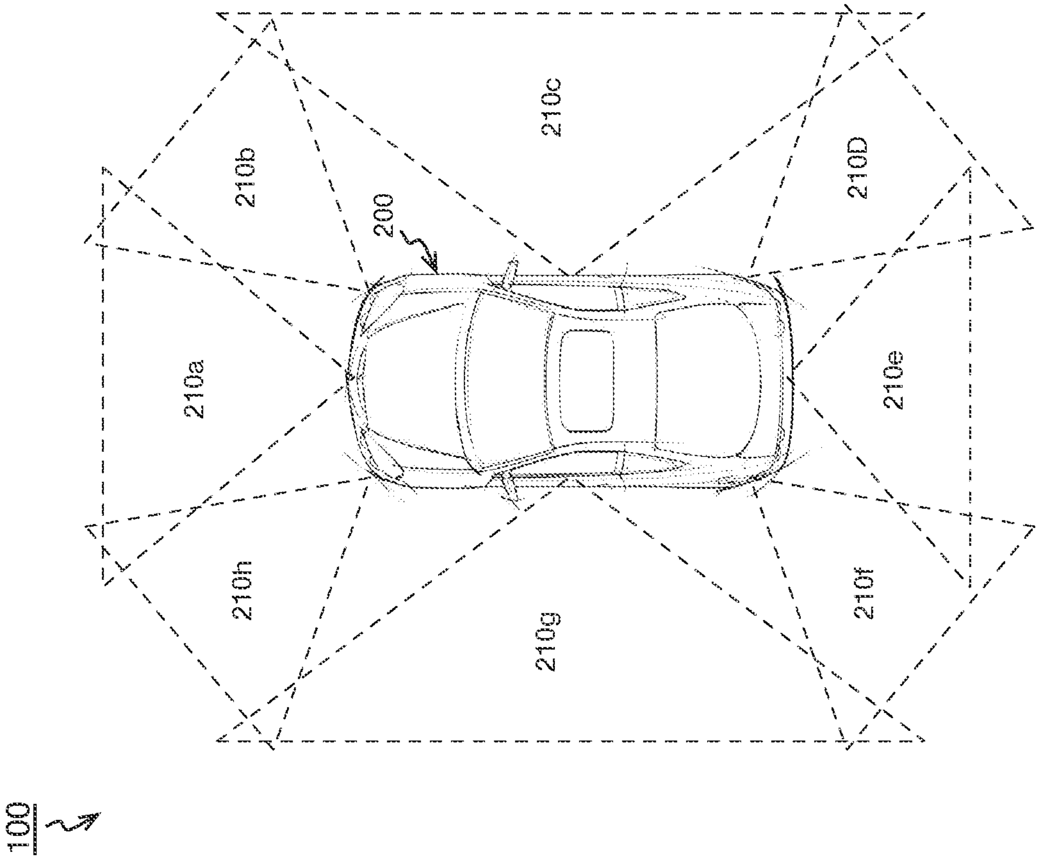
FIG. 1 is an illustration depicting example sensor signal gathering for an example vehicle, in accordance with an embodiment.

References throughout this specification to one implementation, an implementation, one embodiment, an embodiment and/or the like means that a particular feature, structure, and/or characteristic described in connection with a particular implementation and/or embodiment is included in at least one implementation and/or embodiment of claimed subject matter. Thus, appearances of such phrases, for example, in various places throughout this specification are not necessarily intended to refer to the same implementation or to any one particular implementation described. Furthermore, it is to be understood that particular features, structures, and/or characteristics described are capable of being combined in various ways in one or more implementations and, therefore, are within intended claim scope, for example. In general, of course, these and other issues vary with context. Therefore, particular context of description and/or usage provides helpful guidance regarding inferences to be drawn.

As mentioned, some electronic systems and/or devices may include one or more processing circuits (e.g., integrated circuits, processors and/or computing devices, system on chip (SoC), etc.) that may comprise adaptive systems that may change structure, configuration, and/or states, for example, based at least in part on signals and/or states processed by the system and/or device. For example, self-driving/automated driving (e.g., fully autonomous, semi-autonomous, driver assistance systems, etc.) vehicles may comprise a type of adaptive system and/or device implemented via one or more integrated circuits and/or computing devices, for example, that may change its structure, configuration, and/or state based at least in part on sensor signals and/or signal packets gathered over time. Processing such sensor signals and/or signal packets over time to affect operation of a self-driving/automated driving vehicle, for example, may present significant challenges.

Although example implementations and/or embodiments mentioned herein may describe self-driving/automated driving applications (e.g., fully autonomous, semi-autonomous, driver assistance systems, etc.), subject matter is not limited in scope in this respect. For example, a sorting operation and/or verification operation may be performed on sensor signals and/or signal packets, and these operations may be utilized in any of a very wide range of possible applications. Further, "sensor" and/or the like refers to a device and/or component that may respond to physical stimulus, such as, for example, heat, light, sound pressure, magnetism, particular motions, etc., and/or that may generate one or more signals and/or states in response to physical stimulus. Example sensor types may include, but are not limited to, accelerometers, gyroscopes, thermometers, magnetometers, barometers, light sensors, light detection and ranging (LIDAR) sensors, radio detection and ranging (RADAR) sensors, proximity sensors, microphones, cameras, heart rate and/or other biometric monitors, etc., and/or any combination thereof.

FIG. 1 is an illustration depicting an example sensor signal gathering pattern 100 for an embodiment of a vehicle 200. In implementations, a vehicle, such as vehicle 200, may operate in one or more automated driving modes, including fully autonomous, semi-autonomous and/or driver assistance modes, to name a few non-limiting examples. A vehicle, such as vehicle 200, may include a number of sensors. Although a particular pattern and/or a particular number of sensors is depicted in FIG. 1, subject matter is not limited in scope in these respects. For example, a system or device, such as vehicle 200, may include any number of sensors in any of a wide range of arrangements and/or configurations. Also, although FIG. 1 is depicted as a two-dimensional representation, sensors of vehicle 200, for example, may generate signals and/or signal packets representative of conditions surrounding vehicle 200 in a three-dimensional space. In implementations, one and/or two-dimensional sensor measurements may be combined and/or otherwise processed to produce a three-dimensional representation of conditions surrounding vehicle 200, for example.

In implementations, various sensors may be mounted in vehicle 200, for example, to capture measurements for different portions of the environment around and/or adjacent to the vehicle. In implementations, vehicle 200 may include multiple different sensors capable of detecting incoming signals, such as light signals, electromagnetic signals, and/or sound signals, for example. Individual sensors may have different fields of observation into an environment around vehicle 200. Example fields of view 210*a* through 210*h* (210*a*, 210*b*, 210*c*, 210*d*, 210*e*, 210*f*, 210*g* and 210*h*) are depicted although, of course, subject matter is not limited in scope in these respects.

In implementations, sensor signals and/or signal packets may be utilized by at least one computing system of vehicle 200 (e.g., an electronic control unit, or ECU), for example, to identify objects and/or other environmental conditions in the vicinity of vehicle 200 which may be utilized by at least one computing system of vehicle 200 to guide, at least in part, the vehicle through the environment, for example. Example objects that may be detected in an environment surrounding a vehicle, such as vehicle 200, may include other vehicles, trucks, cyclists, pedestrians, animals, rocks, trees, lampposts, guardrails, painted lines, signal lights, buildings, road signs, etc. Some objects may be stationary and other objects, such as pedestrians, may move through the environment.

In an implementation, one or more sensors of example vehicle 200 may generate signals and/or signal packets that may be representative of at least a portion of the environment surrounding and/or adjacent to vehicle 200. Other sensors may provide signals and/or signal packets representative of the speed, acceleration, orientation, position (e.g., via GPS and/or GLONASS), etc. of vehicle 200. As described more fully below, sensor signals and/or signals packets may be processed, such as via a particle filter, to perform a particle filter operation (or other Bayesian filter operation) to estimate a variable or set of variables, such as a pose of the vehicle 200 relative to its environment. The particle filter operation (also referred to as a particle filter) may involve generating a plurality of particles, wherein each of the particles may be a sample, hypothesis, or candidate for the variable or other environmental condition being estimated. Such particles may be utilized, at least in part, to affect operation of vehicle 200, such as an operation that involves determining a location of the vehicle relative to other features (e.g., lane markings) or physical objects (e.g., other vehicles) in an environment of the vehicle. To generate an estimate or a range of estimates for a value(s) of the variable, the particle filter may generate particles, filter out some of the particles, and then may generate new particles in an iterative fashion based on sensor measurements, or more specifically sensor signals and/or signal states, for example. In implementations, as vehicle 200, for example, proceeds through an environment, sensor signals and/or signal states may be utilized, at least in part, to update a particle filter, for example, to further affect operation of the vehicle. The particle filter maybe used as part of a sensor fusion, vehicle localization, or obstacle tracking operation, for example. Vehicle operation may be affected (e.g., responsive at least in part to an update of a particle filter) in any of a wide range of ways. For example, a head unit display may be updated and/or altered, an audible alert may be sounded (e.g., as part of a collision avoidance alert), steering may be affected (e.g., as part of a lane-keeping assist operation), braking may be affected, power deployment may be affected, etc., or a combination thereof, although subject matter is not limited in scope in these respects. As discussed more fully below, for a particle filter and/or the like to make use of the relatively extensive signals and/or signal packets being generated by the various sensors, any of a number of sorting operations may be performed on the sensor signals, signal packets and/or other data (e.g., intermediate data).

Embodiments described herein may be directed to "safe sorting" approaches to help ensure data integrity. For example, embodiments discussed herein may be directed at ensuring that individual data elements remain unaltered during a sorting operation, that no individual data elements are lost during sorting operations, and/or that no new data elements are introduced during sorting operations. Checks may also be made to help ensure that sorting operations are performed in accordance with specified parameters, for example.

In this context, "Particle" refers to a digital representation, derived at least in part from sensor signals and/or signal packets, of an environmental condition for a particular point in a particular coordinate system for a particular point in time. For example, a particular particle may comprise an array of parameters describing a particular point within an environment surrounding vehicle 200 at a particular point in time, or describing a variable of the environment. In implementations, a "particle filter" and/or the like may be utilized to process sensor signals and/or signal packets to generate a plurality of particles for estimating a condition of an environment, such as an environment surrounding vehicle 200. Of course, a particle filter is merely an example type of processing that may be performed on sensor signals and/or signal packets, and subject matter is not limited in scope in this respect. In implementations, a particle filter may be performed by hardware, software and/or a combination thereof.

In implementations, an environment of the vehicle may be represented by a coordinate system. The coordinate system may be a specified coordinate system, although subject matter is not limited in scope to any particular coordinate system. In implementations, such a coordinate system may comprise a three-dimensional parameter space, although other implementations may specify other numbers of dimensions. In implementations, an individual particle may pertain, reference, or describe an observation for a particular location within a particular three-dimensional space (e.g., a particular X, Y, and Z coordinate).

Figure 2:
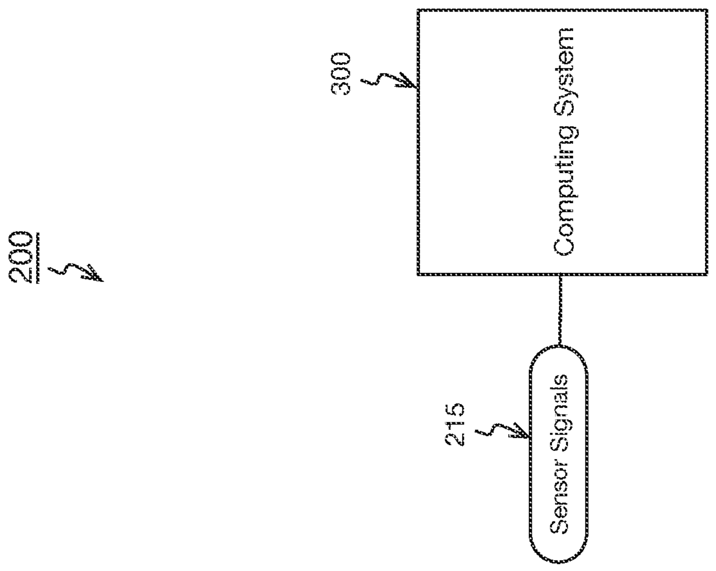
FIG. 2 depicts an example schematic block diagram of an example vehicle, in accordance with an embodiment.

FIG. 2 depicts an example schematic block diagram of example vehicle 200. As mentioned, in implementations, vehicle 200 may include a number of sensors. Such sensors may include, for example, image capture sensors (e.g., cameras), radar, lidar, and/or ultrasonic sensors. In implementations, sensors may generate sensor signals and/or signal packets 215 or other sensor measurements that may be provided to and/or otherwise obtained by a computing system, such as computing system 300. In implementations, a computing system, such as computing system 300, may be implemented in a vehicle, such as vehicle 200. For example, computing system 300 may comprise a head unit display, an infotainment system and/or other vehicle operation system, to name a few non-limiting examples, within vehicle 200. In another example, the computing system 300 may be a vehicle controller that is part of an autonomous driving subsystem, automated driving subsystem, or driver assistance subsystem.

Figure 3:
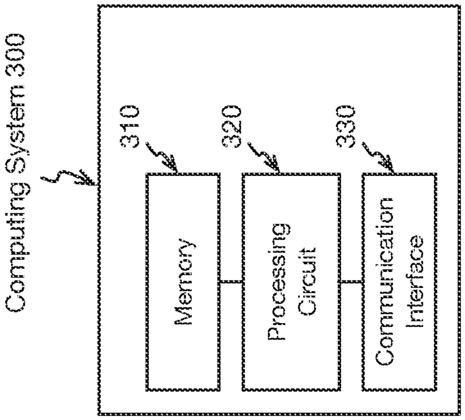
FIG. 3 depicts an example schematic block diagram of an example computing system, in accordance with an embodiment.

As depicted in FIG. 3, computing system 300 may include at least one processing circuit 320, at least one memory device 310 (also referred to as a non-transitory computer-readable medium) and/or at least one communication interface 330, for example. In implementations, the processing circuit 320 of the computing system 300 may include one or more central processing units (CPU) or other microprocessor, a neural network processors (NNP), a field programmable logic array (FPGA), programmable logic controller (PLC), application specific integrated circuit (ASIC) and/or graphics processing units (GPU), for example. The communication interface may include one or more communication devices which are able to receive or obtain sensor measurements from sensors, for example.

Figure 4:
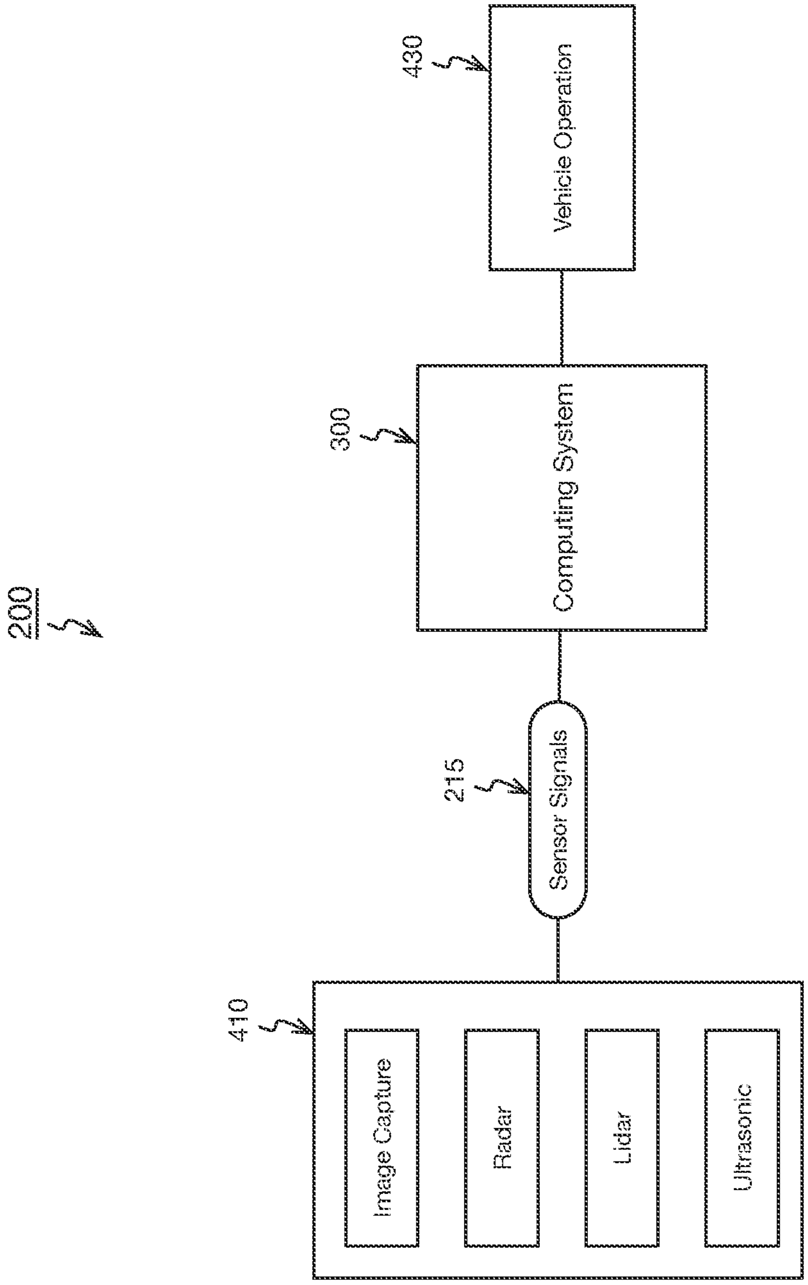
FIG. 4 depicts an example schematic block diagram of an example vehicle, in accordance with an embodiment.

FIG. 4 depicts a more detailed view of example vehicle 200, depicting sensors 410 and vehicle operation functions 430. In implementations, computing system 300 may process sensor signals and/or signal packets 215 to generate signals and/or signal packets that may affect operation of vehicle 200. For example, signals and/or signal packets may be generated by computing system 300 and/or by sensors 410, and may be provided to and/or otherwise obtained by the computing system 300 for a vehicle operation function 430. In implementations, processing of sensor signals and/or signal packets by computing system 300 may include, for example, a particle filter. In implementations, vehicle operation functions 430 may include devices, mechanisms, systems, etc. to affect operation of vehicle 200, for example. As mentioned, as vehicle 200 traverses an environment additional sensor signals and/or signal packets may be obtained and processed such that operation of vehicle 200 may be updated over time.

Figure 5:
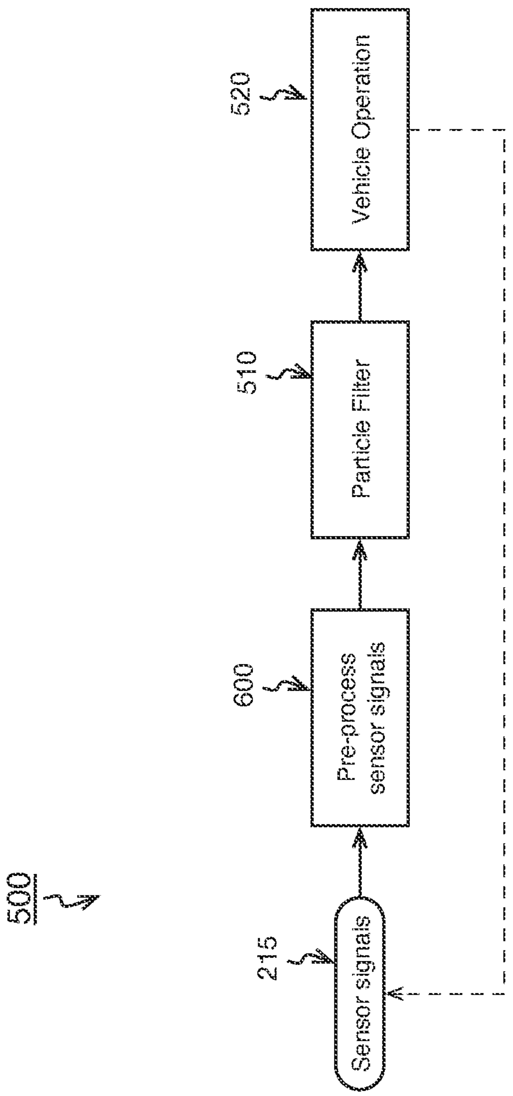
FIG. 5 depicts an example flow diagram of an example process for vehicle operation, in accordance with an embodiment.

FIG. 5 depicts a flow diagram of an example process 500 for automated driving (e.g., fully autonomous, semi-autonomous, driver assistance systems, etc.) vehicle operation, in accordance with an embodiment. Embodiments in accordance with claimed subject matter may include, and is not limited to, all or some of blocks 600, 510 and 520. Likewise, it should be noted that content acquired or produced, such as, for example, input signals, output signals, operations, results, etc. associated with example process 500 may be represented via one or more digital signals. It should also be appreciated that even though one or more operations are illustrated and/or described concurrently and/or with respect to a certain sequence, other sequences or concurrent operations may be employed. In addition, although the description below references particular aspects and/or features illustrated in certain other figures, one or more operations may be performed with other aspects and/or features. In embodiments, blocks 600, 510 and 520 may be performed using signals and/or signal packets among various software, firmware and/or hardware services executed at a computing system, such as vehicle 200. In implementations, blocks 600 and/or 510 may be performed at least in part by a computing system, such as computing system 300, or more specifically by processing circuit 320, and/or at least one memory, such as memory device 310, for example.

As depicted in FIG. 5, example process 500 may include providing sensor signals and/or signal packets 215 to a sensor signal pre-processing operation, as indicated at block 600. Example operations that may be included within "sensor signal pre-processing" may include, for example, sorting operations. In an embodiment, the operation at block 600 may involve the computing system 300 obtaining sensor signals and/or signal packets 215 and performing a sorting operation. In implementations, spatial and/or temporal sorting operations may be performed on sensor signals and/or signal packets to enable, at least in part, a particle filter and/or the like to produce a unified view of an environment surrounding vehicle 200. For example, sorting sensor signals and/or signal packets, such as depicted at block 600, may help process the sensor signals and/or signal packets in preparation for undergoing particle filter operations, such as depicted at block 510. A particle filter may use multiple iterations (also referred to as cycles) for estimating an environmental condition. The particle filter may utilize the sorted sensor signals and/or signal packets towards the beginning of a particular cycle of particle filter operations, such as depicted at block 510, to generate intermediate data, for example. The intermediate data may be, e.g., an updated set of particles which represent an updated distribution of estimated values for the environmental condition. In implementations, such intermediate particle filter data may itself be sorted in accordance with one or more embodiments and/or implementations described herein as part of the particular cycle of particle filter operations, such as depicted at block 510, to prepare for a subsequent cycle of particle filter operations involving additional sensor signals and/or sensor packets, for example, to generate a further set of estimated values.

Spatial and/or temporal sorting operations may be indicated for automated driving (e.g., fully autonomous, semi-autonomous, driver assistance systems, etc.) vehicle sensor applications because the various sensors in such a vehicle may generate signals that may arrive at a processor and/or a memory, for example, out of order with respect to time and/or space. That is, such sensor signals and/or signal packets may arrive at a processing circuit, for example, all "jumbled up." For instance, the computing system 300 may receive a series of many individual sensor measurements $m_1$, $m_2$, $m_3$, $m_4$, . . . $m_n$ that are out of order with respect to time (e.g., instances in time at which the measurements were made) and/or out of order with respect to space (e.g., locations sensed by the measurements). In one example, $m_3$ may have been generated first in time, followed by $m_2$, then $m_1$, and then $m_4$, such that the measurements are out of order temporally. Temporal and/or spatial sorting operations may prepare sensor signals and/or signal packets for further processing, such as by a particle filter as indicated at block 510. Additionally, as mentioned above, sorting operations may be performed as part of the particle filter operations depicted at block 510.

As additionally indicated at block 520, operation of vehicle 200 may be affected, at least in part, based on signals and/or signal packets obtained from block 510 or 600. Of course, as mentioned, subject matter is not limited in scope to the use of particle filters to operate on sensor signals. Rather, any of a wide range of approaches to affecting operation of an automated driving vehicle (e.g., fully autonomous, semi-autonomous, driver assistance systems, etc.) based at least in part on sensor signals and/or signal packets are possible in various implementations. Further, as mentioned, sorting and/or verification operations described herein may be advantageously utilized in any of a wide range of applications, use cases, etc., and subject matter is not limited in scope in these respects.

Figure 6:
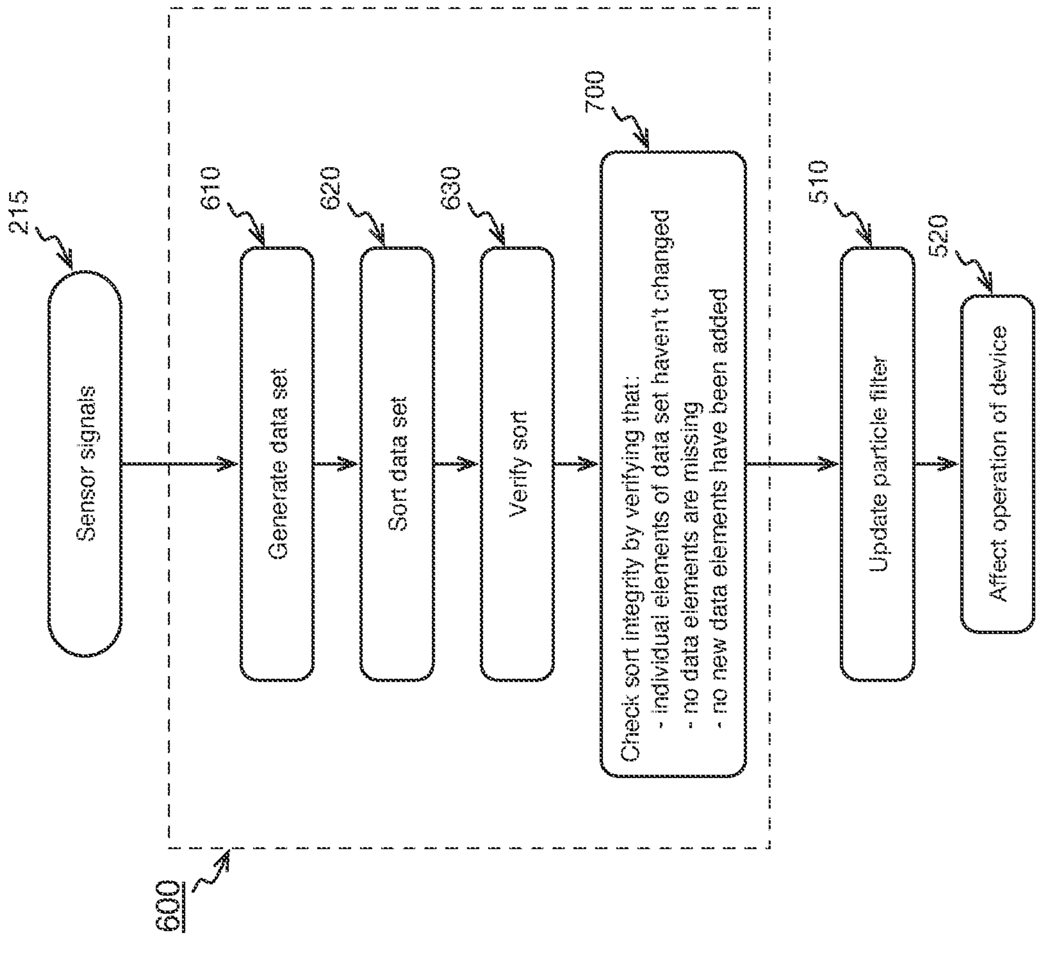
FIG. 6 depicts an example flow diagram of an example process for sorting sensor signals and/or signal packets, in accordance with an embodiment.

FIG. 6 depicts an example flow diagram of block 600, including an example process for sorting sensor signals and/or signal packets. Embodiments in accordance with claimed subject matter may include all of blocks 610-630 and 700, fewer than blocks 610-630 and 700, and/or more than blocks 610-630 and 700. Likewise, it should be noted that content acquired or produced, such as, for example, input signals, output signals, operations, results, etc. associated with example block 600 may be represented via one or more digital signals. It should also be appreciated that even though one or more operations are illustrated or described concurrently or with respect to a certain sequence, other sequences or concurrent operations may be employed. In addition, although the description below references particular aspects and/or features illustrated in certain other figures, one or more operations may be performed with other aspects and/or features. In embodiments, a result of blocks 610-630 and 700 may be communicated as one or more signals and/or signal packets among various software, firmware and/or hardware services executed at a computing device, such as vehicle 200, for example.

As indicated at block 610, example sorting operation at block 600 may include generating a first data set from sensor signals and/or signal packets, such as sensor signals and/or signal packets 215. Such a data set may comprise a plurality of data elements, for example. In an implementation, each data element may include a plurality of values representative of sensor measurements and/or observations pertaining to a particular point (e.g., a coordinate) within a spatial coordinate system. In an implementation, a data element may comprise one or more (e.g., vector, set, etc.) sensor values (e.g., accelerometer measurement, GPS measurement, digital image content, etc.). A sensor measurement or observation may pertain to a point in the spatial coordinate system if the sensor measurement references, describes, or is associated with the point. A set of such data elements may include a plurality of data elements, wherein each of the data elements pertain to different points within a spatial coordinate system, for example.

In implementations, a data set, such as a data set comprising a plurality of data elements, may be sorted, as indicated at block 620. In implementations, any of a wide range of sorting algorithms, techniques, approaches, etc. may be utilized, and subject matter is not limited in scope in these respects. In implementations, sorting operations may include specified spatial aspects, spatial ranges, etc., and/or may include specified temporal aspects, temporal ranges, etc., for example. In implementations, one or more parameters may be specified for a sorting operation. For example, parameters may be specified to indicate a desired spatial and/or temporal ordering and/or to indicate particular spatial and/or temporal ranges, although subject matter is not limited in scope in these respects. For example, the computing system 300 may sort data elements temporally, based at least in part on when sensor measurements in the data elements were generated. The computing system may also or alternatively sort the data elements based on physical distance to a point in space, as discussed below.

In implementations, sorting a set of data elements in accordance with one or more specified parameters may comprise ordering a set of data elements with respect to distance from a specified point along a specified axis and/or trajectory within the spatial coordinate system, for example. Also, in implementations, sorting a set of data elements in accordance with the one or more specified parameters may include selecting the set of data elements based at least in part on a specified range of distance from a specified point along a specified axis and/or trajectory within a spatial coordinate system, for example. Again, subject matter is not limited in scope in these respects.

Further, for example, sorting a set of data elements in accordance with one or more specified parameters may include grouping data elements of the set of data elements into a plurality of subsets based at least in part on particular data elements being located within particular grid cells within the spatial coordinate system. Also, in implementations, sorting may comprise ordering the plurality of subsets with respect to distance of the respective grid cells from a specified point along a specified axis and/or trajectory within the spatial coordinate system, for example.

In implementations, sorting a set of data elements in accordance with one or more specified parameters may comprise selecting the data elements based at least in part on a specified period of time. For example, selecting data elements based at least in part on a specified period of time may include a computing system selecting data elements from a larger set of data elements, wherein the selection is based at least in part on the selected data elements having associated time values that fall within a specified time period. In implementations, associated time values may refer to when sensor values were generated, for example. In implementations, sorting a set of data elements in accordance with one or more specified parameters may also include ordering the set of data elements with respect to temporal proximity to a specified point in time, for example.

As further indicated at block 630, example block 600 may include verification of the sort performed at block 620, for example. In implementations, any of a wide range of algorithms, techniques, approaches, etc. may be utilized to verify that a data set has been sorted correctly. For example, a sorting verification operation, such as indicated at block 630, may determine whether the sorting has been performed in accordance with specified parameters. In an implementation, a sort verification operation, such as indicated at block 630, may include determining whether a particular sort operation, such as indicated at block 620, has produced a specified spatial and/or temporal ordering and/or has produced a specified spatial and/or temporal range, for example.

In implementations, example block 700 may include a process to determine whether the sorting operation performed at block 630 has been performed while maintaining data integrity. For example, as indicated at block 700, a check may be made as to whether data elements of a first set of data elements have remained unaltered during the sorting operation. Checks may also be made to determine whether any data elements of the first set of data elements are missing following the sorting operation. Checks may also be made to determine whether any new data elements have been introduced during the sorting operation. Such verification operations, such as indicated at block 700, are discussed more fully below in connection with FIG. 7.

As discussed previously, sorted sets of data elements may be utilized to update a particle filter, as indicated at block 510, and results from the particle filter indicated at block 510 may affect operation of a device, such as vehicle 200, as indicated at block 520.

Although the discussion above in connection with FIG. 6 may relate substantially to sorting sensor signals and/or signals packets in preparation for providing sorted signals and/or signal packets to a particle filter, other implementations may include sorting operations within the particular filter itself, such as to sort intermediate data, for example. As mentioned, a particle filter may utilize sorted sensor signals and/or signal packets towards the beginning of a particular cycle of operation to generate intermediate data, for example. As also mentioned, such intermediate particle filter data may be sorted as part of the particular cycle of operation to prepare for a subsequent cycle of operation involving additional sensor signals and/or sensor packets, for example.

In implementations, sorting operations within a particle filter may be performed at least in part in accordance with the example operations discussed above in connection with block 600 of FIG. 6. Of course, subject matter is not limited in scope in this respect and, as discussed above, sorting and/or verification operations described herein may be advantageously utilized in any of a wide range of applications, use cases, etc.

Figure 7:
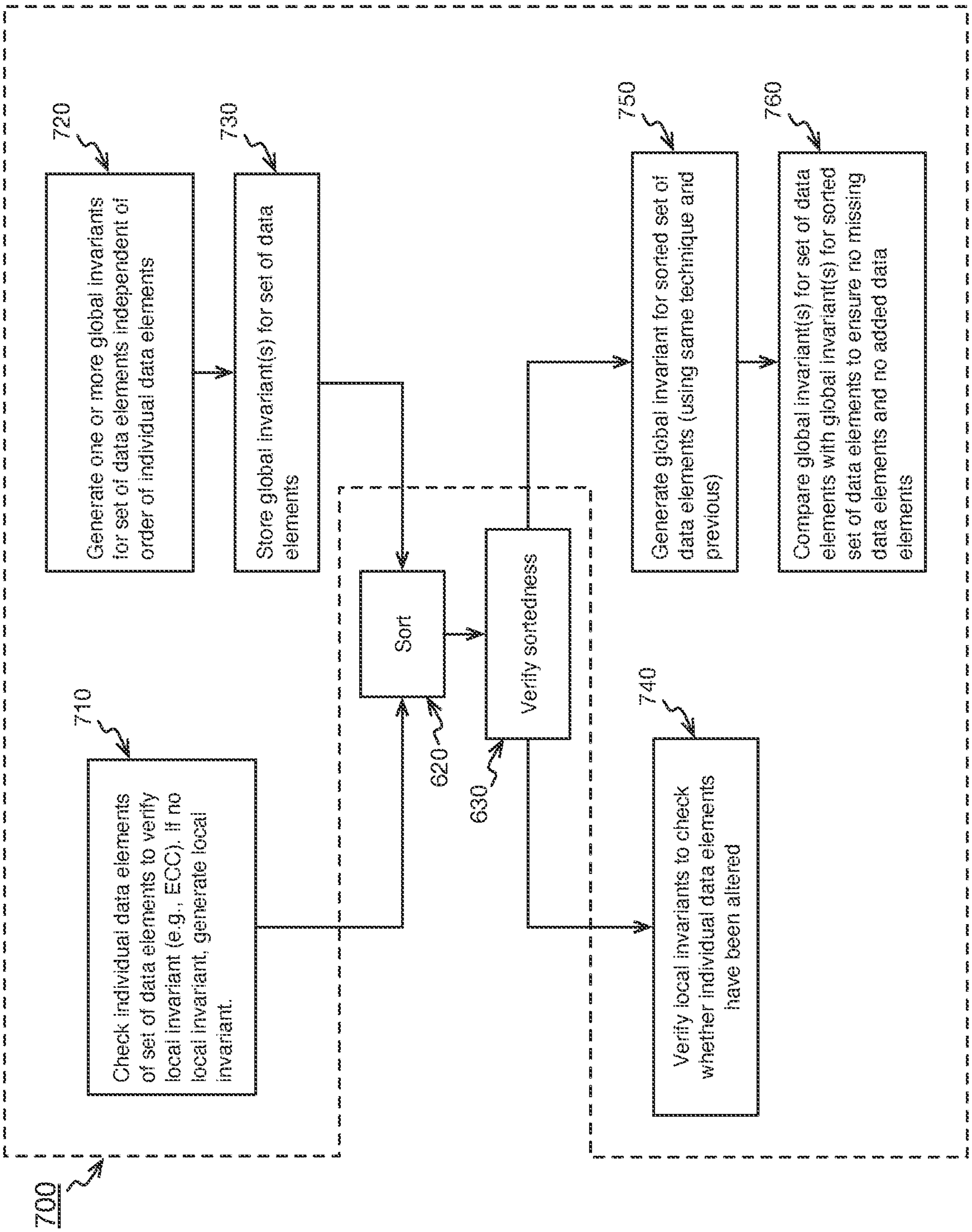
FIG. 7 is an illustration depicting and example flow diagram for verification of a sorting operation, in accordance with an embodiment.

FIG. 7 is an illustration depicting an embodiment of example block 700 including a process to verify data integrity. Embodiments in accordance with claimed subject matter may include all of blocks 710-760, fewer than blocks 710-760, and/or more than blocks 710-760. Likewise, it should be noted that content acquired or produced, such as, for example, input signals, output signals, operations, results, etc. associated with example block 700 may be represented via one or more digital signals. It should also be appreciated that even though one or more operations are illustrated or described concurrently or with respect to a certain sequence, other sequences or concurrent operations may be employed. In addition, although the description below references particular aspects and/or features illustrated in certain other figures, one or more operations may be performed with other aspects and/or features. In embodiments, blocks 710-760 may be communicated as one or more signals and/or signal packets among various software, firmware and/or hardware services executed at a computing system, such as computing system 300 of vehicle 200, for example.

As mentioned previously, sensors of a system or device, such as vehicle 200, may generate signals and/or signal packets, such as sensor signals and/or signal packets 215. A first set of data elements may be generated wherein each data element of the first set of data elements may comprise a plurality of values. In implementations, each data element of a first set of data elements may be derived at least in part from sensor signals and/or signal packets obtained from a plurality of sensors and/or may respectively pertain to particular points within a spatial coordinate system. For example, a first data element of a first set of data elements may pertain to a first point within a coordinate system, and a second data element of the first set of data elements may pertain to a second point within the coordinate system, etc. As also mentioned, the example process indicated at block 600 may also include sorting the first set of data elements in accordance with one or more specified parameters to generate a sorted set of data elements and may further include verifying that the sorted set of data elements has been generated in accordance with the one or more specified parameters.

As further mentioned above, the example process indicated at block 700 may further comprise a verification operation for verifying that each data element of the first set of data elements is included in the sorted set of data elements, that the data elements of the sorted set of data elements are identical to respective data elements of the first set of data elements, and that no additional data elements have been introduced into the sorted set of data elements.

In implementations, the verification operation discussed above may include performing one or more operations based at least in part on a plurality of invariant parameters (also referred to a plurality of invariant parameter values, or a plurality of values of an invariant parameter) pertaining to the set of data elements. For example, as indicated at block 710, each data element of a first set of data elements may include one or more local invariant parameters. "Local invariant" and/or the like refers to a value pertaining to a particular data element derived at least in part from that particular data element. One possible example type of local invariant may include an error correcting code (ECC) or hash value of the data element, although subject matter is not limited in scope in this respect. In implementations, additional local invariant parameters per each data element may be utilized for increased robustness and/or improved data integrity. As further indicated at block 720, if any data element of a set of data elements does not include one or more local invariants, one or more local invariants may be generated. It may be noted that, in implementations, detection and/or generation of local invariants for data elements may be performed precedent to (that is, before) a particular sorting operation, for example.

As indicated at block 720, in implementations, the example process indicated at block 700 may also include, precedent to a particular sorting of a set of data elements, generating one or more global invariant parameters (also referred to as one or more global invariant parameter values, or one or more values of a global invariant parameter) pertaining to the set of data elements. "Global invariant" and/or the like refers to a value pertaining to a first set of data elements derived at least in part from the first set of data elements and further derived independently of any particular ordering of the data elements of the first set of data elements. One possible example global invariant parameter may include a sum of the various values of the various data elements within a set of data elements. Another possible example global invariant parameter may comprise a number of elements within a set of data elements. Other example global invariant parameters may include a sum of local invariant parameters (e.g., ECC, hash value, etc.) for the respective data elements of a set of data elements. However, subject matter is not limited in scope in these respects. As further indicated at block 730, the one or more generated global invariant parameters may be stored in a memory, for example. In implementations, multiple global invariant parameters per each set of data elements may be utilized for increased robustness and/or improved data integrity.

As indicated at blocks 620 and 630 (referring back to example process 600 depicted in FIG. 6, for example), a specified sorting operation may be performed on a first set of data elements and a check may be performed to determine whether the sorting has been performed in accordance with the specified parameters. The sorting operation indicated at block 620 may yield a sorted set of data elements. As mentioned, implementations may include any of a very wide range of sorting algorithms, techniques and/or approaches and/or may include any of a very wide range of algorithms, techniques and/or approaches to verify that the sorting has been performed in accordance with specified parameters (e.g., to verify correct sortedness).

Responsive at least in part to completion of the sorting operation and the production of the sorted set of data elements, checks may be performed to verify that each data element of the first set of data elements is included in the sorted set of data elements, that the data elements of the sorted set of data elements are identical to the respective data elements of the first set of data elements and that no additional data elements have been introduced into the sorted set of data elements, as mentioned previously. For example, as indicated at block 740, subsequent to the sorting operation, individual data elements of the newly created sorted set of data elements may be checked against the previously determined and/or generated local invariant parameters to determine whether any of the individual data elements have been altered.

Also, for example, one or more global invariant parameters may be generated for the sorted set of data elements. In implementations, similar and/or the same techniques utilized to create the one or more global invariant parameters for the first set of data elements may be utilized to generate the one or more global invariant parameters for the sorted set of data elements. In implementations, to verify that the individual elements of the first (non-sorted) set of data elements are included in the sorted set of data elements and that no additional data elements have been introduced into the sorted set of data elements may further include comparing the global invariant parameters pertaining to the sorted set of data elements to the previously-stored (see block 730) global invariant parameters, as indicated at block 760. For circumstances in which the global invariants for the first (non-sorted) set of data elements and the sorted set of data elements match, it may be determined that all of the data elements of the first set of data elements have been included in the sorted set of data elements and the no new data elements have been introduced into the sorted set of data elements.

As mentioned, although example embodiments and/or implementations mentioned herein may describe self-driving/automated driving vehicles (e.g., fully autonomous, semi-autonomous, driver assistance systems, etc.), subject matter is not limited in scope in this respect. That is, example processes, systems and/or devices described herein may be implemented in connection with any of a very wide range of applications and/or use cases. For example, embodiments and/or implementations may be utilized in connection with any of a very wide range of applications, use cases, etc. involving the sorting of sensor signals and/or signal packets and/or data derived therefrom.

Figure 8:
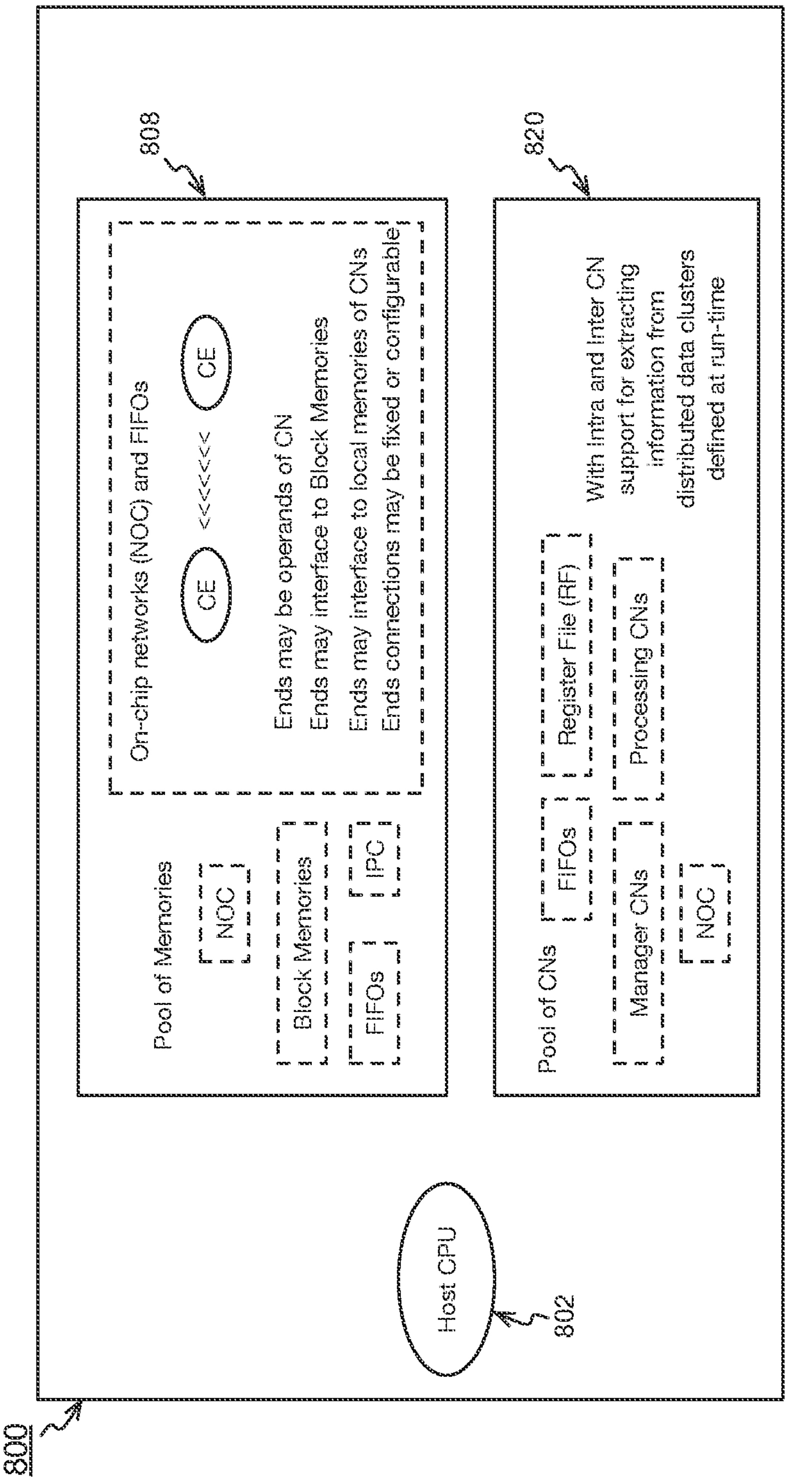
FIG. 8 is a schematic diagram of a computing device to facilitate a processing of multiple signal streams from an associated multiple sources, according to an embodiment.

FIG. 8 is a schematic diagram of a computing device 800 to facilitate a processing of multiple signal streams (e.g., signals and/or signal packets) from an associated multiple sources, according to an embodiment. In a particular implementation, computing device/computing system 800 may include one or more features of computing system 300 (FIG. 3). Computing device 800 may comprise a pool of compute nodes (CNs) 820 with associated register files and local memories, a pool of block memories and first-in first-out (FIFO) buffers and on-chip networks interconnecting various components. CNs in pool of CNs 820 may comprise scalar CNs, vector CNs, very long instruction word (VLIW) engines or a pool of field programmable gate array (FPGA) cells, or a combination thereof, just to provide a few examples of CNs. In one particular implementation, a CN in a pool of CNs 820 may be formed from one or more arithmetic logic units (ALU) integrated/configured with elements of pool of memories 808 such as FIFO buffers. End points of such FIFO buffers integrated/configured with pool of CNs 820 may comprise memory blocks that are local to or isolated from ALUs and/or register files of CNs 820. Functionalities of CNs in pool of CNs 820 may be that of a host processor, processing manager or signal processor, or a combination thereof. According to an embodiment, CNs in pool of CNs 820 may support atomics, interrupts and other inter processor communication (IPC) features to facilitate signal communication between and/or among CNs in pool of CNs 820.

According to an embodiment, computing device 800 may receive signal streams containing data items (e.g., sensor signals, signal packets, observations and/or measurements, time stamps, metadata, etc.) fed from external sources such as sensors and/or memories. External memories (not shown) may be coupled with direct memory access (DMA) controllers and/or engines (not shown). CNs in pool of CNs 820 may also provide sources of signal streams containing data items. For example, a CN in pool of CNs 820 may feed data items as a signal stream into a FIFO buffer, or transport a packet of output parameters within an integrated circuit (IC) device in a network as a block of data items. According to an embodiment, a single logical signal stream may be transmitted in multi-cast fashion to multiple CNs in pool of CNs 820. Also, a single logical stream may be segmented into sub-streams and fed to a sub-set of CNs in pool of CNs 820. In another embodiment, some CNs in pool of CNs 820 may process data items from various signal streams to provide output signal streams as input streams to other CNs in pool of CNs 820. A final output of CNs in pool of CNs 820 may comprise signal streams output from computing device 800 into sinks such as actuators, memories, storages or display devices, just to provide a few examples. Processing between and/or among CNs in pool of CNs 820 may be controlled and/or orchestrated via a combination of interrupts, polling of status flags, and periodic inspection for work, just to provide a few examples.

Figure 9:
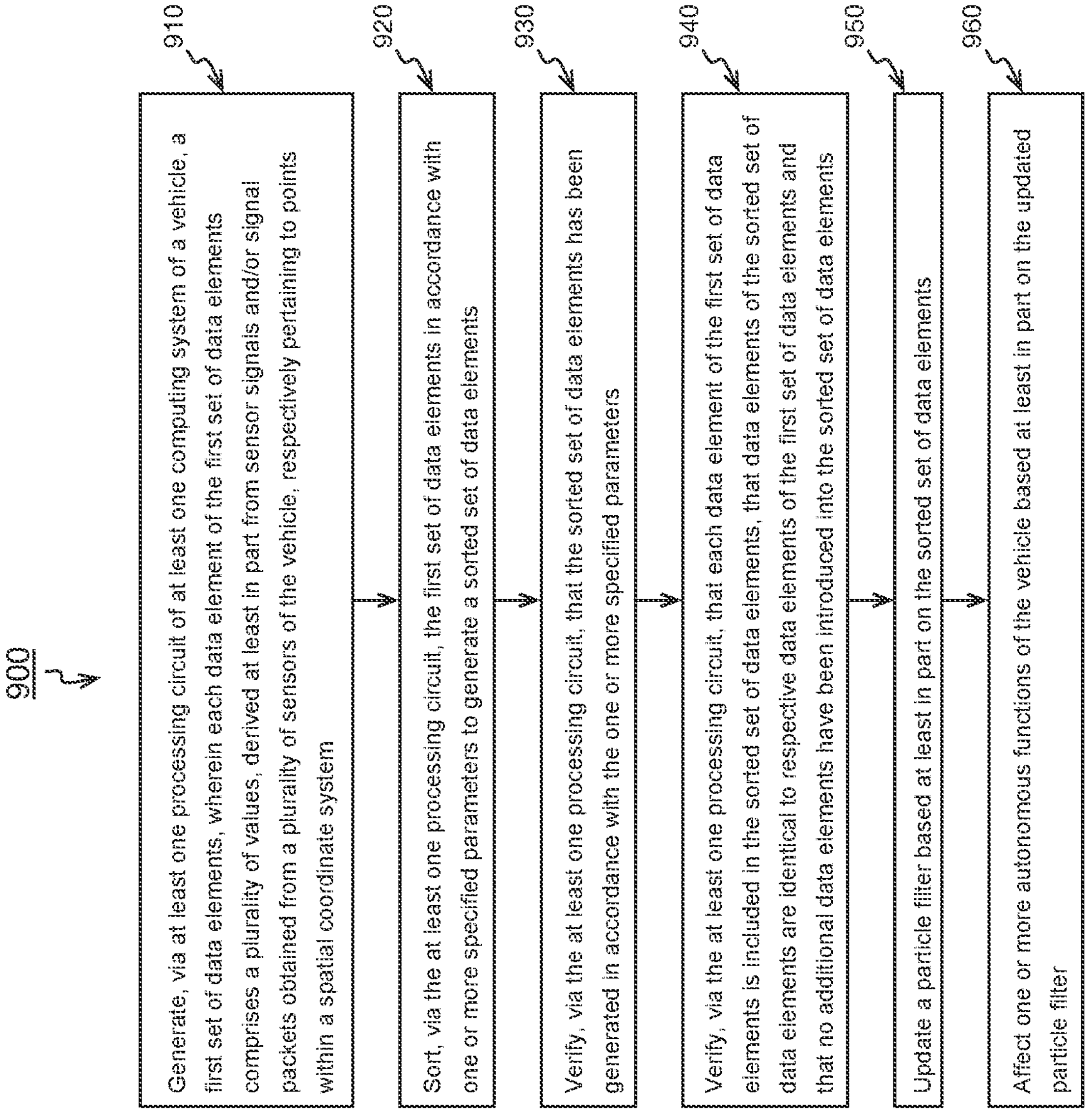
FIG. 9 is an illustration depicting an example flow diagram for a process for verification of sensor signal sorting operations, in accordance with an embodiment; and Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others. Further, it is to be understood that other embodiments may be utilized. Furthermore, structural and/or other changes may be made without departing from claimed subject matter. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, etc.), or to a particular claim. It should also be noted that directions and/or references, for example, such as up, down, top, bottom, and so on, may be used to facilitate discussion of drawings and are not intended to restrict application of claimed subject matter. Therefore, the following detailed description is not to be taken to limit claimed subject matter and/or equivalents.

FIG. 9 is an illustration depicting a flow diagram for an example process 900 for verification of sensor signal sorting operations, in accordance with an embodiment. Embodiments may include all of the operations described, fewer than the operations described, and/or more than the operations described for example process 900. Likewise, it should be noted that content acquired or produced, such as, for example, input signals, output signals, operations, results, etc. associated with the example provided may be represented via one or more analog and/or digital signals and/or signal packets. It should also be appreciated that even though one or more operations, processes, techniques, approaches, etc. are illustrated or described concurrently or with respect to a certain sequence, other sequences or concurrent operations may be employed. Further, it should be noted that operations may be implemented, performed, etc. by any combination of hardware, firmware and/or software. In addition, although the description below references particular aspects and/or features illustrated in certain other figures, one or more operations may be performed with other aspects and/or features.

As depicted at block 910 of FIG. 9, at least one processing circuit (e.g., processing circuit 320 of computing system 300, computing device 800, etc.) of a vehicle, such as vehicle 200, may generate a first set of data elements. In this example, each data element of the first set of data elements may comprise a plurality of values, derived at least in part from sensor signals and/or signal packets obtained from a plurality of sensors of the vehicle. These data elements may respectively pertain to points within a spatial coordinate system. That is, the data elements may be associated with or reference various points, respectively, of the spatial coordinate system. Further, as depicted at block 920, the at least one processing circuit (e.g., processing circuit 320 of computing system 300, computing device 800, etc.) may sort the first set of data elements in accordance with one or more specified parameters to generate a sorted set of data elements.

In implementations, example process 900 may further include verifying, via at least one processing circuit (e.g., processing circuit 320 of computing system 300, computing device 800, etc.) that the sorted set of data elements has been generated in accordance with the one or more specified parameters, as depicted at block 930. Also, as depicted at block 940, example process 900 may include verifying, via at least one processing circuit (e.g., processing circuit 320 of computing system 300, computing device 800, etc.) (i) that each data element of the first set of data elements is included in the sorted set of data elements, (ii) that data elements of the sorted set of data elements are identical to respective data elements of the first set of data elements and (iii) that no additional data elements have been introduced into the sorted set of data elements.

Further, in implementations, a particle filter may be updated based at least in part on the sorted set of data elements, as indicated at block 950. Additionally, as indicated at block 950, one or more autonomous functions of the vehicle may be affected based at least in part on the updated particle filter.

According to an embodiment, all or a portion of computing system 300 and/or computing device/system 800, including, for example, features implementing processes 500, 600, 700 and/or 900, may be formed, implemented by, and/or expressed, in whole or in part, in logic circuits, which may include transistors (e.g., CMOS transistors) and/or lower metal interconnects.

It should be noted that the various circuits disclosed herein may be described using computer aided design tools and expressed (or represented), as data and/or computer-readable instructions embodied in various computer-readable media (e.g., a non-transitory storage medium), in terms of their behavioral, register transfer, logic component, transistor, layout geometries, and/or other characteristics.

In the context of the present patent application, the term "between" and/or similar terms are understood to include "among" if appropriate for the particular usage and vice-versa. Likewise, in the context of the present patent application, the terms "compatible with," "comply with" and/or similar terms are understood to respectively include substantial compatibility and/or substantial compliance.

In the context of the present patent application, the term "connection," the term "component" and/or similar terms are intended to be physical but are not necessarily always tangible. Whether or not these terms refer to tangible subject matter, thus, may vary in a particular context of usage. As an example, a tangible connection and/or tangible connection path may be made, such as by a tangible, electrical connection, such as an electrically conductive path comprising metal or other conductor, that is able to conduct electrical current between two tangible components. Likewise, a tangible connection path may be at least partially affected and/or controlled, such that, as is typical, a tangible connection path may be open or closed, at times resulting from influence of one or more externally derived signals, such as external currents and/or voltages, such as for an electrical switch. Non-limiting illustrations of an electrical switch include a transistor, a diode, etc. However, a "connection" and/or "component," in a particular context of usage, likewise, although physical, can also be non-tangible, such as a connection between a client and a server over a network, particularly a wireless network, which generally refers to the ability for the client and server to transmit, receive, and/or exchange communications, as discussed in more detail later.

In a particular context of usage, such as a particular context in which tangible components are being discussed, therefore, the terms "coupled" and "connected" are used in a manner so that the terms are not synonymous. Similar terms may also be used in a manner in which a similar intention is exhibited. Thus, "connected" is used to indicate that two or more tangible components and/or the like, for example, are tangibly in direct physical contact. Thus, using the previous example, two tangible components that are electrically connected are physically connected via a tangible electrical connection, as previously discussed. However, "coupled," is used to mean that potentially two or more tangible components are tangibly in direct physical contact. Nonetheless, "coupled" is also used to mean that two or more tangible components and/or the like are not necessarily tangibly in direct physical contact, but are able to co-operate, liaise, and/or interact. Likewise, the term "coupled" is also understood to mean indirectly connected. It is further noted, in the context of the present patent application, since memory, such as a memory component and/or memory states, is intended to be non-transitory, the term physical, at least if used in relation to memory necessarily implies that such memory components and/or memory states, continuing with the example, are tangible.

Unless otherwise indicated, in the context of the present patent application, the term "or" if used to associate a list, such as A, B, or C, is intended to mean A, B, and C, here used in the inclusive sense, as well as A, B, or C, here used in the exclusive sense. With this understanding, "and" is used in the inclusive sense and intended to mean A, B, and C; whereas "and/or" can be used in an abundance of caution to make clear that all of the foregoing meanings are intended, although such usage is not required. In addition, the term "one or more" and/or similar terms is used to describe any feature, structure, characteristic, and/or the like in the singular, "and/or" is also used to describe a plurality and/or some other combination of features, structures, characteristics, and/or the like. Likewise, the term "based on" and/or similar terms are understood as not necessarily intending to convey an exhaustive list of factors, but to allow for existence of additional factors not necessarily expressly described.

Furthermore, it is intended, for a situation that relates to implementation of claimed subject matter and is subject to testing, measurement, and/or specification regarding degree, that the particular situation be understood in the following manner. As an example, in a given situation, assume a value of a physical property is to be measured. If alternatively reasonable approaches to testing, measurement, and/or specification regarding degree, at least with respect to the property, continuing with the example, is reasonably likely to occur to one of ordinary skill, at least for implementation purposes, claimed subject matter is intended to cover those alternatively reasonable approaches unless otherwise expressly indicated. As an example, if a plot of measurements over a region is produced and implementation of claimed subject matter refers to employing a measurement of slope over the region, but a variety of reasonable and alternative techniques to estimate the slope over that region exist, claimed subject matter is intended to cover those reasonable alternative techniques unless otherwise expressly indicated.

To the extent claimed subject matter is related to one or more particular measurements, such as with regard to physical manifestations capable of being measured physically, such as, without limit, temperature, pressure, voltage, current, electromagnetic radiation, etc., it is believed that claimed subject matter does not fall within the abstract idea judicial exception to statutory subject matter. Rather, it is asserted, that physical measurements are not mental steps and, likewise, are not abstract ideas.

It is noted, nonetheless, that a typical measurement model employed is that one or more measurements may respectively comprise a sum of at least two components. Thus, for a given measurement, for example, one component may comprise a deterministic component, which in an ideal sense, may comprise a physical value (e.g., sought via one or more measurements), often in the form of one or more signals, signal samples and/or states, and one component may comprise a random component, which may have a variety of sources that may be challenging to quantify. At times, for example, lack of measurement precision may affect a given measurement. Thus, for claimed subject matter, a statistical or stochastic model may be used in addition to a deterministic model as an approach to identification and/or prediction regarding one or more measurement values that may relate to claimed subject matter.

For example, a relatively large number of measurements may be collected to better estimate a deterministic component. Likewise, if measurements vary, which may typically occur, it may be that some portion of a variance may be explained as a deterministic component, while some portion of a variance may be explained as a random component. Typically, it is desirable to have stochastic variance associated with measurements be relatively small, if feasible. That is, typically, it may be preferable to be able to account for a reasonable portion of measurement variation in a deterministic manner, rather than a stochastic matter as an aid to identification and/or predictability.

Along these lines, a variety of techniques have come into use so that one or more measurements may be processed to better estimate an underlying deterministic component, as well as to estimate potentially random components. These techniques, of course, may vary with details surrounding a given situation. Typically, however, more complex problems may involve use of more complex techniques. In this regard, as alluded to above, one or more measurements of physical manifestations may be modelled deterministically and/or stochastically. Employing a model permits collected measurements to potentially be identified and/or processed, and/or potentially permits estimation and/or prediction of an underlying deterministic component, for example, with respect to later measurements to be taken. A given estimate may not be a perfect estimate; however, in general, it is expected that on average one or more estimates may better reflect an underlying deterministic component, for example, if random components that may be included in one or more obtained measurements, are considered. Practically speaking, of course, it is desirable to be able to generate, such as through estimation approaches, a physically meaningful model of processes affecting measurements to be taken.

In some situations, however, as indicated, potential influences may be complex. Therefore, seeking to understand appropriate factors to consider may be particularly challenging. In such situations, it is, therefore, not unusual to employ heuristics with respect to generating one or more estimates. Heuristics refers to use of experience related approaches that may reflect realized processes and/or realized results, such as with respect to use of historical measurements, for example. Heuristics, for example, may be employed in situations where more analytical approaches may be overly complex and/or nearly intractable. Thus, regarding claimed subject matter, an innovative feature may include, in an example embodiment, heuristics that may be employed, for example, to estimate and/or predict one or more measurements.

With advances in technology, it has become more typical to employ distributed computing and/or communication approaches in which portions of a process, such as signal processing of signal samples, for example, may be allocated among various devices, including one or more client devices and/or one or more server devices, via a computing and/or communications network, for example. A network may comprise two or more devices, such as network devices and/or computing devices, and/or may couple devices, such as network devices and/or computing devices, so that signal communications, such as in the form of signal packets and/or signal frames (e.g., comprising one or more signal samples), for example, may be exchanged, such as between a server device and/or a client device, as well as other types of devices, including between wired and/or wireless devices coupled via a wired and/or wireless network, for example.

In the context of the present patent application, the term network device refers to any device capable of communicating via and/or as part of a network and may comprise a computing device. While network devices may be capable of communicating signals (e.g., signal packets and/or frames), such as via a wired and/or wireless network, they may also be capable of performing operations associated with a computing device, such as arithmetic and/or logic operations, processing and/or storing operations (e.g., storing signal samples), such as in memory as tangible, physical memory states, and/or may, for example, operate as a server device and/or a client device in various embodiments. Network devices capable of operating as a server device, a client device and/or otherwise, may include, as examples, dedicated rack-mounted servers, desktop computers, laptop computers, set top boxes, tablets, netbooks, smart phones, wearable devices, integrated devices combining two or more features of the foregoing devices, and/or the like, or any combination thereof. As mentioned, signal packets and/or frames, for example, may be exchanged, such as between a server device and/or a client device, as well as other types of devices, including between wired and/or wireless devices coupled via a wired and/or wireless network, for example, or any combination thereof. It is noted that the terms, server, server device, server computing device, server computing platform and/or similar terms are used interchangeably. Similarly, the terms client, client device, client computing device, client computing platform and/or similar terms are also used interchangeably. While in some instances, for ease of description, these terms may be used in the singular, such as by referring to a "client device" or a "server device," the description is intended to encompass one or more client devices and/or one or more server devices, as appropriate. Along similar lines, references to a "database" are understood to mean, one or more databases and/or portions thereof, as appropriate.

Also, in the context of the present patent application, the term parameters (e.g., one or more parameters) refer to material descriptive of a collection of signal samples, such as one or more electronic documents and/or electronic files and exist in the form of physical signals and/or physical states, such as memory states. For example, one or more parameters, such as referring to an electronic document and/or an electronic file comprising an image, may include, as examples, time of day at which an image was captured, latitude and longitude of an image capture device, such as a camera, for example, etc. In another example, one or more parameters relevant to digital content, such as digital content comprising a technical article, as an example, may include one or more authors, for example. Claimed subject matter is intended to embrace meaningful, descriptive parameters in any format, so long as the one or more parameters comprise physical signals and/or states, which may include, as parameter examples, collection name (e.g., electronic file and/or electronic document identifier name), technique of creation, purpose of creation, time and date of creation, logical path if stored, coding formats (e.g., type of computer instructions, such as a markup language) and/or standards and/or specifications used so as to be protocol compliant (e.g., meaning substantially compliant and/or substantially compatible) for one or more uses, and so forth.

Algorithmic descriptions and/or symbolic representations are examples of techniques used by those of ordinary skill in the signal processing and/or related arts to convey the substance of their work to others skilled in the art. An algorithm is, in the context of the present patent application, and generally, is considered to be a self-consistent sequence of operations and/or similar signal processing leading to a desired result. In the context of the present patent application, operations and/or processing involve physical manipulation of physical quantities. Typically, although not necessarily, such quantities may take the form of electrical and/or magnetic signals and/or states capable of being stored, transferred, combined, compared, processed and/or otherwise manipulated, for example, as electronic signals and/or states making up components of various forms of digital content, such as signal measurements, text, images, video, audio, etc.

It has proven convenient at times, principally for reasons of common usage, to refer to such physical signals and/or physical states as bits, values, elements, parameters, symbols, characters, terms, numbers, numerals, measurements, content and/or the like. It should be understood, however, that all of these and/or similar terms are to be associated with appropriate physical quantities and are merely convenient labels. Unless specifically stated otherwise, as apparent from the preceding discussion, it is appreciated that throughout this specification discussions utilizing terms such as "processing," "computing," "calculating," "determining", "establishing", "obtaining", "identifying", "selecting", "generating", and/or the like may refer to actions and/or processes of a specific apparatus, such as a special purpose computer and/or a similar special purpose computing and/or network device. In the context of this specification, therefore, a special purpose computer and/or a similar special purpose computing and/or network device is capable of processing, manipulating and/or transforming signals and/or states, typically in the form of physical electronic and/or magnetic quantities, within memories, registers, and/or other storage devices, processing devices, and/or display devices of the special purpose computer and/or similar special purpose computing and/or network device. In the context of this particular patent application, as mentioned, the term "specific apparatus" therefore includes a general purpose computing and/or network device, such as a general purpose computer, once it is programmed to perform particular functions, such as pursuant to program software instructions.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and/or storage of charge or a release of stored charge. Likewise, in other memory devices, a change of state may comprise a physical change, such as a transformation in magnetic orientation. Likewise, a physical change may comprise a transformation in molecular structure, such as from crystalline form to amorphous form or vice-versa. In still other memory devices, a change in physical state may involve quantum mechanical phenomena, such as, superposition, entanglement, and/or the like, which may involve quantum bits (qubits), for example. The foregoing is not intended to be an exhaustive list of all examples in which a change in state from a binary one to a binary zero or vice-versa in a memory device may comprise a transformation, such as a physical, but non-transitory, transformation. Rather, the foregoing is intended as illustrative examples.

In the preceding description, various aspects of claimed subject matter have been described. For purposes of explanation, specifics, such as amounts, systems and/or configurations, as examples, were set forth. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all modifications and/or changes as fall within claimed subject matter.

What is claimed is:

1. An apparatus, comprising:

a plurality of sensors to generate a plurality of sensor signals and/or sensor signal packets; and a computing system that includes at least one processing circuit, wherein the at least one processing circuit is to:

generate a first set of data elements, wherein each data element of the first set of data elements comprises a plurality of values, derived at least in part from the sensor signals and/or sensor signal packets, wherein the plurality of values respectively pertain to points within a spatial coordinate system;

before the first set of data elements is sorted:

check one or more local invariant parameter values of each data element of the first set of data elements, and generate a first set of global invariant parameter values for the first set of data elements independent of order of individual data elements;

sort the first set of data elements in accordance with one or more specified parameters to generate a sorted set of data elements;

after the first set of data elements is sorted, generate a second set of global invariant parameter values for the sorted first set of data elements;

verify that the sorted set of data elements has been generated in accordance with the one or more specified parameters;

verify (i) that each data element of the first set of data elements is included in the sorted set of data elements, (ii) that each data element of the sorted set of data elements is identical to a respective data element of the first set of data elements, and (iii) that no additional data elements have been introduced into the sorted set of data elements, by:

a comparison between the first set of global invariant parameter values and the second set of global invariant parameter values, and a verification of the one or more local invariant parameter values for the first set of data elements against respective data elements of the sorted set of data elements after the sorting;

update a particle filter based at least in part on the sorted and verified set of data elements; and affect one or more autonomous functions of a vehicle based at least in part on the updated particle filter, wherein the apparatus comprises the vehicle.

2. The apparatus of claim 1, wherein:

the at least one processing circuit is to update the particle filter by generating, based on the sorted set of data elements, an estimate or range of estimates for a variable that represents a vehicle environment surrounding the vehicle, and the at least one processing circuit is further to control a driver assistance function or an autonomous or automated driving function of the vehicle based on the estimate or range of estimates for the variable which represents the vehicle environment.

3. The apparatus of claim 2, wherein the spatial coordinate system is divided into a plurality of grid cells, and wherein, to sort the first set of data elements in accordance with the one or more specified parameters, the at least one processing circuit is to:

group the first set of data elements into a plurality of subsets based at least in part on which respective grid cells are the respective points of the data elements located within; and order the plurality of subsets with respect to distance of the respective grid cells from a specified point along a specified axis and/or trajectory within the spatial coordinate system.

4. The apparatus of claim 2, wherein the first set of data elements are associated with respective time values, and wherein, to sort the first set of data elements in accordance with the one or more specified parameters, the at least one processing circuit is to:

select the first set of data elements based at least in part on a specified period of time; and order the first set of data elements with respect to temporal proximity between: (i) the respective time values associated with the first set of data elements and (ii) a specified point in time.

5. The apparatus of claim 1, wherein the one or more local invariant parameter values are derived at least in part from the data elements of the first set of data elements.

6. The apparatus of claim 1, wherein the first set of global invariant parameters values for the first set of data elements are derived at least in part from the first set of data elements and are further derived independent of any particular order of the data elements of the first set of data elements.

7. The apparatus of claim 6, wherein the comparison between the first set of global invariant parameter values and the second set of global invariant parameter values is configured to verify that each data element of the first set of data elements is included in the sorted set of data elements and that no additional data elements have been introduced into the sorted set of data elements.

8. The apparatus of claim 1, wherein at least one global invariant parameter value of the first set of global invariant parameter values for the first set of data elements is based on a sum of a plurality of values respectively representative of the data elements of the first set of data elements and/or is based on a number of data elements within the first set of data elements.

9. The apparatus of claim 1, wherein the at least one processing circuit is further to, before sorting the first set of data elements and to check the one or more local invariant parameter values, determine whether the data elements of the first set of data elements respectively include the one or more local invariant parameter values.

10. The apparatus of claim 9, wherein at least one local invariant parameter value of the one or more local invariant parameter values is based on an error correction code.

11. The apparatus of claim 9, wherein the at least one processing circuit is further to, before sorting the first set of data elements, for one or more of the data elements of the first set of data elements determined to not include the one or more local invariant parameter values, generate the one or more local invariant parameter values for the respective one or more of the data elements of the first set of data elements determined to not include the one or more local invariant parameter values.

12. The apparatus of claim 9, wherein the verification, of the one or more local invariant parameter values for the first set of data elements against respective data elements of the sorted set of data elements after the sorting, is configured to verify that the data elements of the sorted set of data elements are identical to the respective data elements of the first set of data elements.

13. A method comprising:

generating, via at least one processing circuit of a computing system of a vehicle, a first set of data elements, wherein each data element of the first set of data elements comprises a plurality of values, derived at least in part from sensor signals and/or sensor signal packets obtained from a plurality of sensors of the vehicle, wherein the plurality of values respectively pertain to points within a spatial coordinate system;

before sorting the first set of data elements:

checking one or more local invariant parameter values of each data element of the first set of data elements, and generating a first set of global invariant parameter values for the first set of data elements independent of order of individual data elements;

sorting, via the at least one processing circuit, the first set of data elements in accordance with one or more specified parameters to generate a sorted set of data elements;

after the sorting, generating a second set of global invariant parameter values for the sorted first set of data elements;

verifying, via the at least one processing circuit, that the sorted set of data elements has been generated in accordance with the one or more specified parameters;

verifying, via the at least one processing circuit, (i) that data elements of the first set of data elements are included in the sorted set of data elements, (ii) that data elements of the sorted set of data elements are identical to respective data elements of the first set of data elements, and (iii) that no additional data elements have been introduced into the sorted set of data elements, by:

a comparison between the first set of global invariant parameter values and the second set of global invariant parameter values, and a verification of the one or more local invariant parameter values for the first set of data elements against respective data elements of the sorted set of data elements after the sorting;

updating, via the at least one processing circuit, a particle filter based at least in part on the sorted and verified set of data elements; and affecting, via the at least one processing circuit, one or more autonomous functions of the vehicle based at least in part on updating the particle filter.

14. The method of claim 13, wherein the spatial coordinate system is divided into a plurality of grid cells, wherein sorting the first set of data elements in accordance with the one or more specified parameters comprises grouping the first set of data elements into a plurality of subsets based at least in part on which respective grid cells are the respective points of the data elements located within, and wherein sorting the first set of data elements in accordance with the one or more specified parameters further comprises ordering the plurality of subsets with respect to distance of the respective grid cells from a specified point along a specified axis and/or trajectory within the spatial coordinate system.

15. The method of claim 13, wherein the first set of global invariant parameter values for the first set of data elements are derived at least in part from the set of data elements and are further derived independent of any particular order of the data elements of the first set of data elements.

16. The method of claim 15, wherein the comparison between the first set of global invariant parameter values and the second set of global invariant parameter values is configured for verifying that the data elements of the first set of data elements are included in the sorted set of data elements and that no additional data elements have been introduced into the sorted set of data elements.

17. The method of claim 16, wherein a particular global invariant parameter value of the first set of global invariant parameter values for the first set of data elements comprises a sum of a plurality of values respectively representative of the data elements of the first set of data elements and/or comprises a number of elements within the first set of data elements.

18. The method of claim 13, wherein the verification, of the one or more local invariant parameter values for the first set of data elements against respective data elements of the sorted set of data elements after the sorting, is configured for verifying that the data elements of the sorted set of data elements are identical to the respective data elements of the first set of data elements.

19. The method of claim 18, wherein at least one of the one or more local invariant parameter values comprises an error correction code.

20. An article, comprising: a non-transitory storage medium having computer-readable instructions stored thereon that are executable by at least one processing circuit of a computing system of a vehicle to:

generate a first set of data elements, wherein each data element of the first set of data elements comprises a plurality of values, derived at least in part from sensor signals and/or sensor signal packets obtained from one or more sensors of the vehicle, wherein the plurality of values respectively pertain to points within a spatial coordinate system;

before the first set of data elements is sorted:

check one or more local invariant parameter values of each data element of the first set of data elements, and generate a first set of global invariant parameter values for the first set of data elements independent of order of individual data elements;

sort the first set of data elements in accordance with one or more specified parameters to generate a sorted set of data elements;

after the first set of data elements is sorted, generate a second set of global invariant parameter values for the sorted first set of data elements;

verify that the sorted set of data elements has been generated in accordance with the one or more specified parameters;

verify (i) that each data element of the first set of data elements is included in the sorted set of data elements, (ii) that each data element of the sorted set of data elements is identical to respective data elements of the first set of data elements and (iii) that no additional data elements have been introduced into the sorted set of data elements, by:

a comparison between the first set of global invariant parameter values and the second set of global invariant parameter values, and a verification of the one or more local invariant parameter values for the first set of data elements against respective data elements of the sorted set of data elements after the sorting;

update a particle filter based at least in part on the sorted and verified set of data elements; and affect one or more autonomous functions of the vehicle based at least in part on the updated particle filter.

* * * * *